United States Patent [19]

Yamane et al.

[11] 3,900,549

[45] Aug. 19, 1975

[54] METHOD OF SPINNING COMPOSITE FILAMENTS

[75] Inventors: Tadayuki Yamane; Yutaka Hirano, both of Kurashiki, Japan

[73] Assignee: Kuraray Co., Ltd., Okayama, Japan

[22] Filed: June 1, 1973

[21] Appl. No.: 366,095

[30] Foreign Application Priority Data

June 6, 1972 Japan.............................. 47-56686

[52] U.S. Cl.............. 264/176 F; 260/873; 264/171; 264/210 F
[51] Int. Cl................................................ D01d 5/08
[58] Field of Search............ 264/171, 176 F, 210 F; 260/862, 873

[56] References Cited
UNITED STATES PATENTS
2,604,667  7/1952  Hebeler ............................ 264/108

3,681,189  8/1972  Matsui et al. ........................ 264/171
3,684,647  8/1972  Matsui et al. ........................ 264/171
3,729,449  4/1973  Kimura et al. ...................... 264/171

FOREIGN PATENTS OR APPLICATIONS
43-28788  12/1968  Japan ............................. 264/210 F
41-6348   4/1966   Japan.............................. 264/171

*Primary Examiner*—Jay H. Woo
*Attorney, Agent, or Firm*—Sherman & Shalloway

[57] ABSTRACT

A method for preparing composite filaments composed of a polyethylene and a polyester, which comprises mixing a polyethylene having a melt index of above 27 with a polyester having a specific inherent viscosity, the proportion of the polyethylene being 5 to 15% or 25 to 90% based on the total weight of the mixture, melt extruding the resulting mixture through a spinneret, and then withdrawing the extruded filaments at a speed of above 2,500 meters per minute.

7 Claims, No Drawings

METHOD OF SPINNING COMPOSITE FILAMENTS

This invention relates to a method of spinning composite filaments composed of a polyethylene and a polyester and, in particular, to a method of preparing composite filaments of a polyethylene and a polyester by high speed spinning.

It is known that a polyolefin and a polyester that is incompatible therewith can be spun in the molten blended state. However, conceivably because of the fact that the polyolefins and the polyesters differ in their physical or chemical characteristics, their blend spinning cannot be carried out stably, it being especially difficult to carry out their spinning at high speeds.

With a view to finding a way of blend spinning the polyolefins and the polyesters stably, we engaged in extensive research involving the blend spinning of various polyolefins and polyesters and thus were able to finally perfect the present invention.

In accordance with the present invention, there is provided a method of spinning a composite filament composed of a polyethylene and a polyester, which is characterized by operating in the following manner. A polyethylene having a melt index of at least 27 and a fiber-forming polyester are mixed so as to satisfy one of the following conditions (1) and (2):

1. The polyethylene accounts for 5 – 15 % by weight of total weight of the mixture and moreover the relationship $0 \leq x \leq 30v + 0.3w - 26$ [this will be referred to as relationship (1)] is satisfied, where $x$ is the content in weight % of the polyethylene to the total weight of the mixture,
   $v$ is the intrinsic viscosity (dl/g) of the polyester, and
   $w$ is the melt index of the polyethylene;

2. The polyethylene accounts for 25 – 90 % by weight of the total weight of the mixture and the relationship $$38 - 40v + \frac{1050}{w} \leq x \leq 85v - \frac{1600}{w} + 48$$

[this will be referred to as relationship (2)] is satisfied, where $x$, $v$ and $w$ are as above defined; the resulting mixture is melt-extruded through the orifices of a spinneret; and thereafter the extruded filaments are withdrawn at a speed of above 2,500 meters per minute.

The invention will now be more fully described.

A most important feature of the method of the present invention resides in the fact that the spinning at high speeds of a composite filament composed of polyethylene and polyester has been made possible. Further, the preparation of a composite filament composed of polyethylene and polyester, which possesses sufficiently high practicality for various applications, has been made possible by high speed spinning only, with the omission of the drawing step that has usually been considered necessary. While the properties required of a filament for making it of practical use will vary somewhat depending upon its application or the subsequent treatment steps it is to be submitted to, in general, it must have a tensile strength of at least 1.5 grams per denier. The compatibility of polyethylene and polyester is poor, as hereinbefore noted, and hence, difficulty is experienced in blend spinning of these two components, the difficulty being especially great when the spinning is to be carried out a high speeds. Consequently, in the conventional methods of preparing the composite filament of polyethylene and polyester, the usual method employed has been that wherein a filament of low tenacity was first prepared at a low speed and then the filament was drawn in the drawing step for imparting to it the necessary tenacity for making it useful for practical purposes. On the other hand, we found for the first time that if the spinning of the composite filament of polyethylene and polyester is carried out such as to satisfy specific conditions, it becomes possible to carry out the spinning of the foregoing filament at a high speed in excess of 2,500 meters per minute and that if the spinning is carried out at such a high speed, it becomes possible to obtain a filament having a tenacity of at least 1.5 grams per denier even though the drawing step is omitted. In addition, we found the surprising facts that for obtaining a filament having a tenacity of at least 1.5 grams per denier by only high speed spinning with the omission of the drawing step it is necessary that the spinning be carried out at a speed in excess of 2,500 meters per minute, and moreover that in blend spinning polyolefins with polyesters polyethylene is the only polyolefin that makes possible such a high speed spinning; the achievement of high speed spinning, such as above indicated, being impossible in the case of the polyolefins other than polyethylene.

It was found that in blend spinning polyethylene with polyester the high-speed spinnability was greatly affected by the proportion in which the polyethylene and the polyester were mixed as well as the molecular weights of these two components. When the melt index of the polyethylene is less than 27, it becomes impossible to carry out the spinning at high speeds of above 2,500 meters per minute no matter in what proportion the polyethylene is mixed. Hence, the melt index of the polyethylene must be at least 27, and preferably at least 30. In blend spinning polyethylene with polyester, it was found that, in general, there was an improvement in the blend-spinnability as the molecular weight of the polyethylene became lower (i.e., as the melt index became greater) or as the molecular weight of the polyester became greater. However, when the molecular weight of the polyethylene is too low, it becomes necessary to carry out an extremely intense cooling below the spinneret. Hence, the polyethylene used should be one whose melt index is not greater than 200, and preferably not greater than 150. On the other hand, when the molecular weight of the polyester is too high, a higher spinning temperature becomes necessary which gives rise to problems from the operational standpoint. Hence, it is preferred that the polyester used be one intrinsic viscosity of about an 0.5 to 0.9, a most preferred intrinsic viscosity being being 0.55 – 0.80.

Further, the spinnability is also greatly affected by the proportion in which the polyethylene and polyester are mixed. When a small amount of polyethylene is mixed with the polyester, there is an abrupt drop in the spinnability, the minimum spinnability being reached at a point where the weight % ($x$) of the polyethylene to the total weight of the polyethylene and the polyester is about 20 %. Thereafter, as the proportion of the polyethylene mixed is increased beyond this point, the spinnability again rises to reach its maximum value in the neighborhood where $x$ is about 50 %. However, when the content of polyethylene is increased beyond this point, the spinnability again starts to decline. And no matter what the molecular weights of the polyethylene and polyester are, it becomes impossible to withdraw the filaments at a speed above 2,500 meters per minute when the proportion in which the polyethylene is mixed exceeds 15 weight % and is less than 25 weight %, or in the case where the proportion of the polyethylene mixed exceeds 90 weight %. It is possible to withdraw the filaments at speeds above 2,500 meters per minute when the amount mixed of the polyethylene is less than 5 weight %, and the tenacity of the so obtained filament also exceeds 1.5 grams per denier. This is not to be desired, however, since the so obtained filament has no practical value as a composite filament, because of its extreme inclination to the polyester-rich side.

Again, in the blend-spinning of polyethylene and polyester, the mixture ratio of the two components which makes possible the spinning at high speeds of above 2,500 meters per minute depends on the molecular weights of the polyethylene and polyester to be mixed. When the weight % ($x$) of the polyethylene is within the range 5 – 15 %, $x$ must satisfy at the same time the relationship of the foregoing expression (1). On the other hand, when $x$ falls within the range 25 – 90 %, $x$ must satisfy at the same time the relationship of the foregoing expression (2).

The expression "fiber-forming polyesters," as used herein, means the macromolecular, linear polyesters composed of a dibasic acid and a diol, as typified by polyethylene terephthalate, and the self-condensed products of such as the ω-hydroxycarboxylic acids, and comprehends all the linear polyesters having a high melting point and fiber-formability. The composite filament in this invention can contain, in a small quantity of an order as is usually used, any of the per se known additives such as thermal stabilizers, photostabilizers and pigments, which are usually used mixed with fibers. When these additive components are contained, it is to be understood that the value of $x$ in the expressions (1) and (2) means the weight % of the polyethylene to the total weight of only the two components of polyethylene and polyester and excludes the foregoing additive components.

One method of blend spinning the polyethylene and the polyester comprises mixing the two macromolecular components in their pellet, chip, flake or powder form and then melt blend spinning the resulting mixture with a screw extruder, i.e., the so-called blend spinning method, which is not only a simple but an excellent method as well. An alternate method comprises mixing the two macromolecular components in their molten state at an optional stage prior to the extrusion of the melt blend from the orifices of the spinneret followed by the extrusion of the melt blend therefrom, e.g., the so-called conjugated spinning method such as disclosed in U.S. Pat. No. 2,932,079.

As the method of withdrawing at high speeds the composite filaments that have been extruded from the spinneret, any of the known methods can be employed such as the use of rolls rotating at high speeds, a gaseous conveying medium, or a combination of these methods. The composite filaments extruded from the spinneret are preferably cooled at a suitable zone near the spinneret.

On observation of a section cut perpendicular to the filamentary axis of the composite filament of the present invention, i.e., composed of the two components of polyethylene and polyester, it was found that one of the components was present as a continuous phase, whereas the other component was present independently as islands floating in a sea surrounded by the foregoing continuous phase.

The portion present as a continuous phase will be referred to herein as the "sea," while the portions surrounded by this sea will be referred to as "islands." As is apparent from the foregoing description, the invention composite filament has a fibrous structure which usually comprises a plurality of islands present insularly scattered in the sea. As to which of the two components of polyethylene and polyester will become the sea and which will become the islands will depend upon the proportion in which the two components are mixed, the molecular weights of the components and the interfacial tension between the components and thus cannot be readily determined. However, it was found that so long as the blend spinning is carried out in such a manner that the conditions specified by the present invention are satisfied, filaments in which the polyester becomes the sea and the polyethylene becomes the islands are produced when the weight % ($x$) of polyethylene is within the range of 5 to 15 % and, on the other hand, filaments in which the polyethylene becomes the sea and the polyester becomes the islands are produced when $x$ is within the range of 25 – 90 %.

In consequence of the fact that the invention composite filament has a unique fibrous structure, such as above described, it possesses unique characteristics which make it useful for various applications. Especially, when it is used as the starting fiber material for the production of nonwoven sheet material, it demonstrates its maximum usefulness. As regards this point, a fuller description will be given hereinafter.

When composite filaments prepared by the of the present invention method and in which polyethylene is the sea and polyester is islands is submitted to an extraction treatment by means of a solvent to extract and remove only the polyethylene, a substantially continuous multifiber bundle in which microfibers of polyester are assembled in a parallel arrangement is obtained. The term "microfiber," as herein used, refers to a fiber of extremely fine denier whose diameter is below several microns, in which the length of the fiber does not matter. And the multifiber bundle refers to a product formed as a result of assemblage of a plurality of microfibers. We found that when a nonwoven sheet material was made up of the multifiber bundles obtained in a manner described above it was possible to obtain a sheet material whose hand was very pliable.

The conventional nonwoven fabric, especially the spun-bond type nonwoven fabric, being stiff and bulky, lacked draping properties, with the consequence that it was greatly restricted in extending its application is such fields as principally garments where pliability is required. However, when the spun-bond type nonwoven fabric is formed with the multifiber bundles of the present invention, these shortcomings are completely overcome and a nonwoven fabric excelling in draping properties can be obtained. The following method is convenient for producing nonwoven sheet materials using the composite filaments of the present invention.

A polyethylene having a melt index of at least 27 and a fiber-forming polyester are mixed. In this case the content of the polyethylene in this mixture is in the range of 25 to 90 % by weight, and the relationship, $$38 - 40 + \frac{1050}{w} \leq x \leq 85v - \frac{1600}{w} + 48,$$

where $x$, $v$ and $w$ are as above defined, is satisfied. The resulting mixture is then melt-extruded from a spinneret and withdrawn by the nozzle operated by means of a gaseous conveying medium, following which the extruded filaments are withdrawn at a high speed of above 2,500 meters per minute and collected in web form by a suitable apparatus. Thereafter, the filaments are bonded with a suitable adhesive at their intersecting or contacting portions to bond the filaments to each other. When this is followed by the extraction and removal of a part or a major portion of the polyethylene, a pliable sheet material composed of multifiber bundles consisting of an assemblage of microfibers of polyester is produced. Further, if necessary, the sheet material may be submitted to a needle punching treatment during an optional step in its production. Or it may be submitted to optional treatments in accordance with its intended final use, such as a mechanical crumpling treatment for rendering it pliable, a slicing treatment in its thickness direction or treatment of its surface with a resin such as polyvinyl chloride.

As previously stated, the most important use of the invention composite filament is its use as the starting fiber for the preparation of nonwoven fabrics. Hence, the preferred embodiment is that in which the polyethylene is the sea and the polyester is the islands. Thus, in the invention method, the case where the weight % ($x$) of the polyethylene is in the range of 25 – 90% is to preferred over the case where $x$ is in the range of 5 – 15 %, the most preferred range of $x$ being 35 – 70 % by weight.

The following examples will be given for more fully illustrating the invention, it being understood that these are only for illustration and not in limitation of the invention.

The intrinsic viscosity of the polyester, as used herein, is that measured at 30°C. in a phenol: tetrachloroethane (1:1) mixture, while the melt index of the polyethylene is that measured in accordance with the ASTM D1238-57T. On the other hand, the maximum withdrawing speed, as used in the examples, is defined as the maximum speed at which the filament can be withdrawn for 5 minutes without any breakage of the filament.

EXAMPLE 1

Polyethylene terephthalate having an intrinsic viscosity of 0.75 and polyethylene whose melt index was varied as indicated in the following Table 1 were mixed in their chip form at a polyethylene terephthalate to polyethylene weight ratio of 1:1 (i.e., with $x = 50$ weight %). This was followed by melt blending the mixture with a usual screw extruder and extrusion of the melt blend from a spinneret having 10 orifices each 0.4 mm in diameter. After the filaments had cooled, their maximum withdrawing speed was tested using rolls rotating at high speeds. The results obtained are shown in Table 1.

Table 1

| Run No. | Melt index of polyethylene | Maximum withdrawing speed (m/min.) | Range of x calculated with expression (2) |
|---|---|---|---|
| 1 | 7 | 600 | — |
| 2 | 23 | 2200 | — |
| 3 | 32 | 2900 | $40.8 \leq x \leq 61.8$ |
| 4 | 53 | 4100 | $27.8 \leq x \leq 81.6$ |

For withdrawing the filaments at a speed of above 2,500 meters per minute, the melt index of polyethylene is thus at least 27, and preferably at least 30.

EXAMPLE 2

Polyethylene of a melt index of 67 and polyethylene terephthalate of an intrinsic viscosity of 0.7 were mixed in a weight ratio of 1:1, and by using the same apparatus as that of Example 1 the spinning of filaments was carried out while varying the withdrawing speeds as indicated in Table 2 to obtain composite filaments of about 3 denier fineness. When the range of $x$ was calculated with the expression (2), it was $25.7 \leq x \leq 83.9$, and thus the $x$ value of 50 employed in this example satisfies the relationship (2).

When the tensile strengths of the filaments obtained were measured, the results shown in the following table were obtained.

Table 2

| Run No. | Withdrawing speed(m/min.) | Denier | Tensile strength(g/d) |
|---|---|---|---|
| 1 | 2000 | 3.3 | 1.05 |
| 2 | 2500 | 3.0 | 1.58 |
| 3 | 3000 | 2.8 | 1.90 |
| 4 | 3500 | 3.3 | 2.25 |
| 5 | 4000 | 3.3 | 2.41 |
| 6 | 4500 | 3.0 | 2.66 |

As is apparent from Table 2, it can be seen that even though $x$ is within the prescribed range a tensile strength of above 1.5 grams per denier cannot be achieved for the filament in the case where the process employed is one in which the drawing step is omitted and the filament is only withdrawn at a high speed, unless the withdrawal speed is above 2,500 meters per minute.

The following Examples 3 – 7 illustrate the instances where the filaments obtained by the invention method are used for forming nonwoven fabrics.

EXAMPLE 3

Polyethylene having a melt index of 35 was mixed with sereval polyethylene terephthalates having intrinsic viscosities of 0.58, 0.68, 0.76 and 0.45, following which the mixtures were melt blended in a screw extruder and extruded from a spinneret having 10 orifices each 0.4 mm in diameter at the rate of 1.2 grams per minute per orifice. After the filaments had cooled, they were withdrawn at a speed of about 3,000 meters per minute by means of an air gun (the instance where the polyethylene terephthalate having an intrinsic viscosity of 0.45 being exluded) and were subsequently collected atop a wire netting where they were arranged thereon in random fashion to obtain a web. In the case where the intrinsic viscosities of the polyethylene terephthalate were 0.58, 0.68 and 0.76, the range of $x$, as calculated with the expression (2), were 44.8 ≦ x ≦ 51.6, 40.8 ≦ x ≦ 61.0 and 37.6 ≦ x ≦ 66.9, respectively, and hence in these three cases the relationship (2) was satisfied. Further, in these three cases the filaments withdrawn by means of the air gun were in all cases composite filaments in which the polyethylene terephthalate was the islands and the polyethylene was the sea.

Next, the resulting web was needle punched (280 punches per square centimeter) and then the bonding of the filaments to each other was performed by treating the web with an adhesive of the following composition by applying the adhesive such that about 30 % of the adhesive would become adhered based on the fibers.

| Composition of adhesive. | |
|---|---|
| HYCAR LX — 812 (Nippon Zeon Co., Ltd. Product) | 40% |
| SUMITEX M—3 (Sumitomo Chemical Co. product) | 4 |
| ACCELERATOR —KX (Sumitomo Chemocal Co. product) | 1 |
| C. M. C. | 6 |
| Water | 49 |

This was followed by hot pressing the web for 5 minutes at 150°C. to effect the cross-linking of the adhesive. When the polyethylene contained in the composite filaments was then extracted and removed in toluene at 85°C. exclusive of the case where the polyethylene terephthalate having an intrinsic viscosity of 0.45 was used, a pliant sheet material composed of microfibers of polyester was obtained.

On the other hand, in the case where the polyethylene terephthalate having an intrinsic viscosity of 0.45 was used, it was impossible to withdraw the filaments at 2,500 meters per minute; the highest speed that the filaments could be taken up was 1,500 meters per minute at the most. Moreover, the resulting composite filaments were made up of islands of polyethylene and sea of polyethylene terephthalate. After withdrawing the filaments at a speed of 1,500 meters per minute, the filaments were arranged in random to form a web followed by processing as hereinbefore described to obtain a sheet material. However, since polyethylene is the islands in this case, its extraction and removal was practically impossible, with the consequence that the sheet material obtained was a stiff product whose hand was not too satisfactory.

The properties of the thus obtained several sheet materials are shown in Table 3.

EXAMPLE 4

Polyethylene having a melt index of 53 and polyethylene terephthalate having an intrinsic viscosity of 0.70 were mixed in their chip state at weight ratio of 4:6 (x = 40 weight %), melt blended in a screw extruder and by operating exactly as in Example 3 were prepared into sheet materials having a weight of about 250 g/m², except that the quantity of the melt blend per orifice and the withdrawing speed by means of the air gun were varied as follows: 1.0 gram per minute — 2,000 meters per minute, 1.25 grams per minute — 2,500 meters per minute and 2.0 grams per minute — 4,000 meters per minute. The range of x as calculated with the expression (2) was 29.8 ≦ x ≦ 70.3, and thus the x value of 40 employed in this example satisfies the relationship (2).

The resulting sheet materials were in all cases pliant and had a satisfactory hand. However, in the case of that in which the filaments were withdrawn at a speed of 2,000 meters per minute there were breakages in the composite filaments or the formation of loops in the filaments, with the consequence that the surface of the sheet was somewhat rough. The surface conditions of those withdrawn at above 2,500 meters per minute were also good. Again, the tenacities of the filaments were 4.2 kg/cm, 5.7 kg/cm and 6.9 kg/cm, respectively, that of the filament withdrawn at 2,000 meters per minute being small.

EXAMPLE 5

Polyethylene terephthalate having an intrinsic viscosity of 0.68 and polyethylenes having melt indices of 7, 23, 30 and 68 were mixed severally in their chip form in a weight ratio of 1:1 (x = 50 weight %), after which the experiment was operated as in Example 3 except that the filaments were withdrawn at the speeds of respectively 600, 2,000, 2,800 and 4,000 meters per minute by means of an air gun while paying due regard to ensure that the breakage of the filaments does not take place. As a result, sheet materials of a weight of about 250 grams per square meter were obtained.

Now, when the melt indices were 30 and 68, the range of x calculated with the expression (2) was 45.8 ≦ x ≦ 52.5 and 26.2 ≦ x ≦ 82.3, respectively. Thus, the value of x of 50 employed in this example satisfies the relationship (2).

When polyethylenes having melt indices of 30 and 68 were used and the withdrawing speeds were 2,800 and 4,000 meters per minute, pliant products having a satisfactory hand were obtained and, in addition, the products were also fully satisfactory in respect of their tenacity. On the other hand, in the case where the polyethylenes used were those having melt indices of 23, 30 and 68 and the speed of withdrawal of the filaments was 2,000 meters per minute, the products, though having pliancy and satisfactory hand, had a surface which was somewhat coarse and also were inferior in their tenacities as compared with the above-mentioned two products. When the melt index of the polyethylene was 7, the product was poor in its hand and surface Table 3

| Run No. | Intrinsic viscosity of PET | Weight (g/m²) | Thickness (mm) | Tenacity (kg/cm) | Elongation (%) | Tear strength (kg) | Young's modulus (kg/mm²) | Flexural rigidity (cantilever) (mm) |
|---|---|---|---|---|---|---|---|---|
| 1 | 0.58 | 261 | 0.69 | 6.1 | 65 | 5.2 | 3.8 | 75 |
| 2 | 0.68 | 247 | 0.66 | 5.9 | 78 | 4.2 | 4.3 | 61 |
| 3 | 0.76 | 235 | 0.63 | 5.8 | 72 | 4.6 | 4.5 | 60 |
| 4 | 0.45 | 305 | 0.68 | 5.5 | 58 | 5.0 | 4.0 | 125 | condition as well as its tenacity, and hence it was of no practical use.

EXAMPLE 6

A conventional conjugated spinning nozzle was used, and by using 50 weight % of polyethylene terephthalate of an intrinsic viscosity of 0.7 as the island component and 50 weight % of polyethylene having a melt index of 30 as the sea component ten conjugated filaments each having 15 ends of the island components were spun by extruding the melt blend in an amount of 1.2 grams per minute per filament, following which the filaments were withdrawn and subsequently collected atop a wire netting and arranged thereon in random fashion to obtain a web. When the range of the value of $x$ was calculated with the expression (2), it was $45 \leq x \leq 54.1$, and thus the value of $x = 50$ adopted in the present example satisfies the relationship (2).

Next, after submitting the so obtained web to a needle punching treatment of 280 punches per square centimeter, it was treated with an adhesive having the same composition as in Example 3 such that about 30 % of the adhesive would adhere to the fibers based thereon. Then, after drying the web at room temperature, it was hot pressed for 5 minutes at 150°C. to effect the cross-linking of the adhesive. This was followed by the extraction and removal of the sea component of the fibers in toluene at 85°C. to obtain a pliant sheet material composed of microfibers of polyester.

The properties of the so obtained sheet material are shown below.

| | |
|---|---|
| Weight(grams/m$^2$) | 254 |
| Thickness (mm) | 0.82 |
| Tenacity (kg/cm) | 58 |
| Elongation (%) | 69 |
| Tear strength (kg) | 4.6 |
| Young's modulus(kg/mm$^2$) | 4.2 |
| Flexural rigidity(cantilever)(mm) | 70 |

EXAMPLE 7

Polyethylene having a melt index of 35 and an isophthalic acid-copolymerized polyester (isophthalic acid/terephthalic acid = 1/9) having an intrinsic viscosity of 0.7 were mixed in their chip form at the several weight ratios of 20/80, 50/50 and 70/30 (of which only the 50/50 mixture satisfies the range specified by the present invention). The sheet materials were then produced as in Example 3 by withdrawing the filaments with an air gun. When the range of $x$ was calculated by means of the expression (2), it was $40 \leq x \leq 61.7$. Hence, the weight ratio 50/50 satisfies the relationship (2), but the weight ratio 70/30 does not satisfy this relationship.

In this case of the mixtures whose ratios were 20/80 and 70/30, the filaments could only be withdrawn at 1,100 and 2,100 meters per minute, respectively, and the sheet materials made from these filaments were both obviously inferior in respect of their hand and tenacity to the sheet material made from the filaments whose mixture ratio was 50/50, and which could be withdrawn at 3800 meters per minute.

What is claimed is:

1. A method of spinning composite filaments composed of a polyethylene and a polyester which comprises mixing a polyethylene having a melt index of above 27 but below 200 with a fiber-forming polyester having an intrinsic viscosity of 0.5 to 0.9 so that the following condition is satisfied:

the weight % of the polyethylene to the total weight of the mixture is in the range of 25 to 90 % and moreover the relationship $$38 - 40v + \frac{1050}{w} \leq x \leq 85v - \frac{1600}{w} + 48$$

is satisfied, wherein $x$ is the weight % of the polyethylene to the total weight of the mixture, $v$ is the intrinsic viscosity of the polyester, and $w$ is the melt index of the polyethylene;

following which the resulting mixture is melt extruded from orifices of a spinneret; and thereafter the extruded filaments are withdrawn at a speed of above 2,500 meters per minute.

2. The method of claim 1 wherein the melt index is 30 – 150.

3. The method of claim 1 wherein the intrinsic viscosity of the polyester is 0.55 – 0.80.

4. The method of claim 1 wherein the value of x is in the range of 35 – 70 % by weight.

5. The method of claim 1 wherein said polyester is polyethylene terephthalate.

6. The method of claim 1 wherein the melt extrusion of said mixture is carried out by the blend spinning method.

7. The method of claim 1 wherein the melt extrusion of said mixture is carried out by the conjugated spinning method.

* * * * *